(12) United States Patent
Nussbaum et al.

(10) Patent No.: US 10,191,550 B1
(45) Date of Patent: Jan. 29, 2019

(54) FABRIC DEVICES WITH SHAPE MEMORY ALLOY WIRES THAT PROVIDE HAPTIC FEEDBACK

(71) Applicant: Apple Inc., Cupertino, CA (US)

(72) Inventors: Michael B. Nussbaum, Santa Cruz, CA (US); Mark J. Beesley, Carmel Valley, CA (US); Daniel D. Sunshine, Sunnyvale, CA (US); Christopher A. Schultz, San Francisco, CA (US); Daniel A. Podhajny, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/592,049

(22) Filed: May 10, 2017

Related U.S. Application Data (60) Provisional application No. 62/334,827, filed on May 11, 2016.

(51) Int. Cl.
   *G06F 3/01* (2006.01)
   *G06F 3/044* (2006.01)

(52) U.S. Cl.
   CPC .............. *G06F 3/016* (2013.01); *G06F 3/044* (2013.01)

(58) Field of Classification Search
   CPC ................................ G06F 3/016; G06F 3/044
   See application file for complete search history.

(56) References Cited

U.S. PATENT DOCUMENTS

| | | | |
|---|---|---|---|
| 9,161,878 B1* | 10/2015 | Pamplin | A61H 23/02 |
| 2005/0098413 A1* | 5/2005 | Uehira | H01H 61/0107 200/5 R |
| 2006/0238517 A1* | 10/2006 | King | G06F 1/1626 345/173 |
| 2009/0002328 A1* | 1/2009 | Ullrich | G06F 3/016 345/173 |
| 2013/0154984 A1* | 6/2013 | Gondo | G06F 3/016 345/173 |

OTHER PUBLICATIONS

Zhao et al., Compact Braille display using SMA wire array, 6 pages.
Sawada, A study of Displaying Tactile/Haptic Sensations Using the Micro-Vibrations Generated by SMA wires, Microsoft Research, IJARC CORE10 project summary booklet, pp. 26-31.

(Continued)

*Primary Examiner* — Ryan A Lubit
(74) *Attorney, Agent, or Firm* — Treyz Law Group, P.C.; G. Victor Treyz; David K. Cole

(57) ABSTRACT

An electronic device may have haptic output devices based on shape memory alloy wire. The electronic device may have control circuitry that supplies current to the shape memory alloy wire to heat and thereby contract the shape memory wire to create vibrations for a user's finger. The vibrations may serve as haptic feedback in a device such as a keyboard, a strap with embedded buttons, or other electronic devices. The shape memory alloy wire may run between upper and lower fabric layers in a spacer fabric, may form loops that attached to a fabric layer, or may be tensioned across an opening in a printed circuit or other rigid support structure.

17 Claims, 10 Drawing Sheets

(56) References Cited

OTHER PUBLICATIONS

Vasile et al., Analysis of Hybrid Woven Fabrics with Shape Memory Alloys Wires Embedded, Fibres & Textiles in Eastern Europe, 2010, vol. 18, No. 1 (78) pp. 64-69.
Janouchova et al., Functional Warp-Knitted Fabrics with Integrated Superelastic NITI Filaments, AUTEX Research Journal, Jun. 2012, vol. 12, No. 2, pp. 34-39.
Wan et al., Shape Memory Training for Intelligent Fabrics, RJTA, 2007, vol. 11, pp. 11-17.
Gok et al., Shape-Memory Applications in Textile Design, Procedia—Social and Behavioral Sciences, 2015, pp. 2160-2169.
Daverman, A Novel Binary Actuator Using Shape Memory Alloy, Massachusetts Institute of Technology Department for Mechanical Engineering, 2005, pp. 1-140.

* cited by examiner

FABRIC DEVICES WITH SHAPE MEMORY ALLOY WIRES THAT PROVIDE HAPTIC FEEDBACK

This application claims the benefit of provisional patent application No. 62/334,827, filed May 11, 2016, which is hereby incorporated by reference herein in its entirety.

FIELD

This relates generally to electronic devices and, more particularly, to electronic devices with components that provide haptic output.

BACKGROUND

Devices such as keyboards may be incorporated into laptop computers and other equipment. Some keyboards have keys that click when pressed by a user. The clicks provided by the keys help alert a user when the keys have been pressed satisfactorily. Keys that are not pressed sufficiently will not click.

Mechanical clicking mechanisms may be used to provide this type of haptic feedback for a user of a keyboard, but mechanical clicking mechanisms may consume more space than desired. This may make it difficult or impossible to provide haptic feedback in a compact device such as a thin keyboard or other device in which space is at a premium.

SUMMARY

An electronic device may have haptic output devices based on shape memory alloy wire. The electronic device may have control circuitry that supplies current to the shape memory alloy wire to heat the wire and thereby contract the wire to create vibrations for a user's finger. The vibrations may serve as haptic feedback in a device such as a keyboard, a strap with embedded buttons, or other electronic devices.

The shape memory alloy wire may run between upper and lower fabric layers in a spacer fabric, may form loops that are sewn onto a fabric layer, or may be tensioned across an opening in a printed circuit or other rigid support structure. Conductive strands of material such as warp and weft fibers in a woven fabric may be coupled to the ends of a shape memory alloy wire.

DETAILED DESCRIPTION

Electronic devices may be provided with input-output devices. The input output devices may include devices that gather input from a user (e.g., touch sensors, buttons, force sensors, etc.) and devices that provide haptic feedback (e.g., tactile output in the form of vibrations that are picked up by a user's fingers). The haptic output devices may be separate from the input devices or may be configured to provide haptic feedback for associated input devices. As an example, a keyboard may have a capacitive touch sensor array integrated into a fabric layer that serves as an array of keys for gathering touch input (key presses) from a user. In this type of device, haptic devices may be used to provide haptic feedback to the user whenever a user presses one of the keys (i.e., a vibration for a button click or other haptic feedback may be provided whenever a key input is detected to help inform the user that the user has successfully completed the key input). Haptic devices may be formed from shape memory alloy structures such as lengths of shape memory alloy wire.

Figure 1:
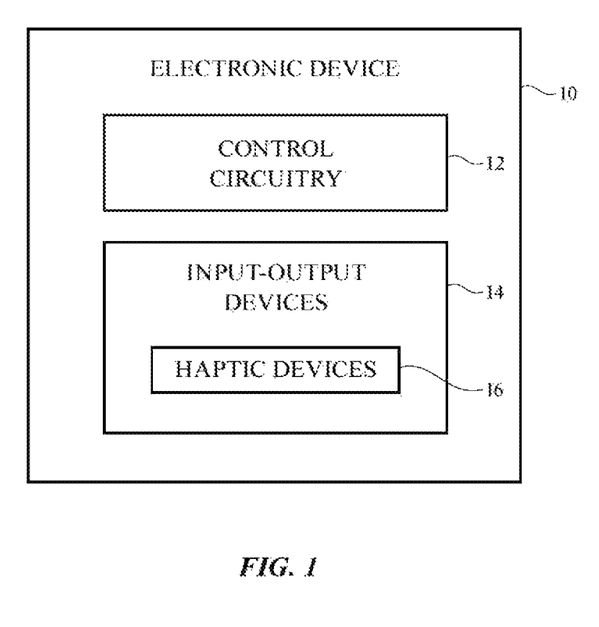
FIG. 1 is a schematic diagram of an illustrative electronic device in accordance with an embodiment.

A schematic diagram of an illustrative electronic device of the type that may include haptic devices such as haptic devices based on shape memory alloy wire is shown in FIG. 1. Electronic device 10 of FIG. 1 may be an electronic device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic device 10 is mounted in a kiosk, in an automobile, airplane, or other vehicle, other electronic equipment, or equipment that implements the functionality of two or more of these devices. If desired, electronic device 10 may be a removable external case for electronic equipment or other device accessory, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, shirt, pants, shoes, etc.), may be a keyboard, or may be any other suitable device that includes circuitry.

As shown in FIG. 1, electronic device 10 may have control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 14 may be used to allow data to be supplied to device 10 and to allow data to be provided from device 10 to external devices. Input-output devices 14 may include buttons, joysticks, scrolling wheels, touch pads, key pads, keyboards, microphones, speakers, tone generators, vibrators, cameras, sensors, light-emitting diodes and other status indicators, displays, data ports, etc. Input-output devices 14 may include haptic devices 16 such as haptic devices based on shape memory alloys (e.g., nickel-titanium or other alloys). Shape memory alloys exhibit a phase change (between austenite and martensite for nickel-titanium) upon heating and cooling. As a result, shape memory alloys can be made to contract when heated with an applied current and can be allowed to relax to an uncontracted state when cooled by removing the applied current. These shape memory alloy properties allow electronically controlled haptic output devices to be formed from lengths of shape memory alloy wire.

Control circuitry 12 may be used to run software on device 10 such as operating system code and applications. During operation of device 10, the software running on control circuitry 12 may use input-output devices 14 to gather user input (e.g., key press input or other input from a keyboard, button press input from a button on a fabric wrist band or other fabric item, or other input from input-output devices 14) and to supply the user with output using input-output devices 14. Device 10 may, for example, supply a user with haptic output using haptic devices 16 (e.g., haptic feedback to inform a user that a key in a keyboard, a button on a watch band, or other input device has been received). Input-output devices may, if desired, include shape memory alloy wire actuators for providing vibrating alerts (haptic alerts) and other haptic output (i.e., haptic output that is not necessarily directly related to confirming a key press or button press). In general, shape memory alloy devices may be used for forming any suitable actuators. The use of shape memory alloy wire to form haptic devices such as devices that provide a user with haptic feedback while the user is supplying a keyboard or other input device with input is sometimes described herein as an example.

Figure 2:
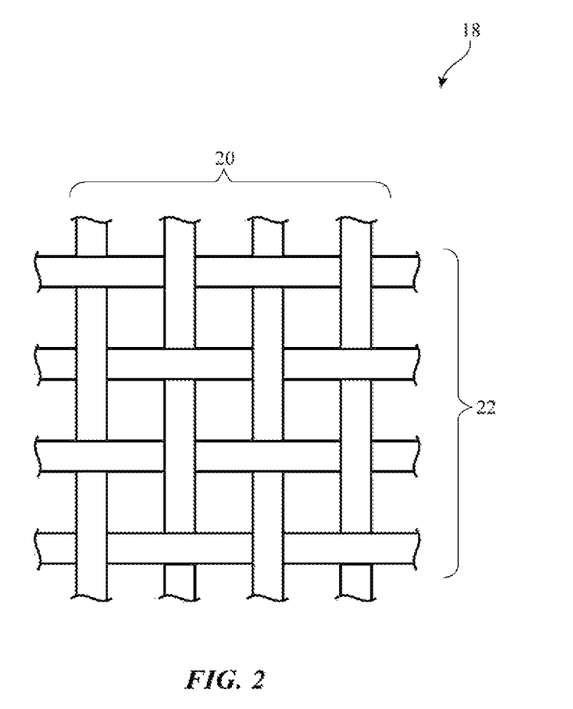
FIG. 2 is a top view of illustrative fabric in accordance with an embodiment.

Device 10 may include fabric. Fabric may be used to form a housing structure, part of a strap or band, a cover for a keyboard, or other structures in device 10. Fabric may be knitted, braided, woven, or otherwise formed from intertwined fibers. As an example, the fabric for device 10 may include woven fabric such as illustrative woven fabric 18 of FIG. 2. As shown in FIG. 2, fabric 18 may include strands of material such as warp strands 20 and perpendicular strand of material such as weft strands 22. Fabric 18 may have a plain weave, a basket weave, may be a three-dimensional fabric (e.g., a spacer fabric), or may have other suitable fabric constructions. Strands 20 and 22 may include insulating strands and/or conductive strands. Conductive strands may be formed from metal wires, metal wires coated with polymer, metal coatings on insulating strands of material such as glass or polymer strands, or other suitable conductive structures. Insulating strands may be formed from polymer, other dielectric, multiple dielectric layers, or other suitable insulating structures. Strands of material in fabric 18 may be monofilaments or may be multifilament yarns. Fabric 18 may include exclusively insulating strands, may include exclusively conductive strands, or may include a mixture of insulating and conductive strands. For example, fabric 18 may include insulating strands and conductive strands and the conductive strands may be used in carrying signals associated with input-output devices 14 (e.g., currents for controlling haptic devices 16, sensor signals, etc.).

Figure 3:
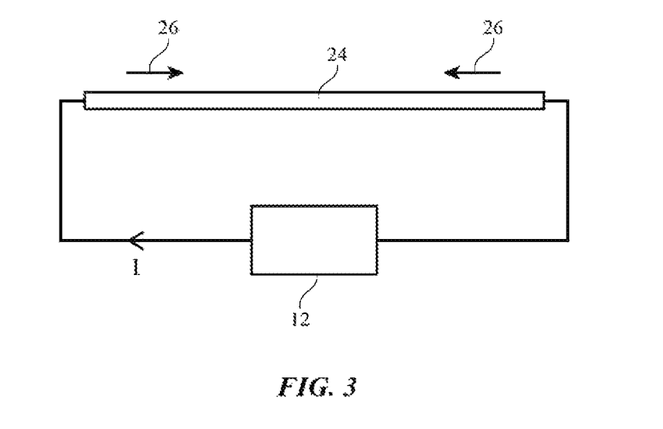
FIG. 3 is a diagram showing how a haptic device formed from shape memory alloy wire may be provided with current from control circuitry to heat and thereby constrict the wire in accordance with an embodiment.

As shown in FIG. 3, a shape memory alloy wire such as wire 24 may receive a control signal from control circuitry 12 such as current I. When current I is applied to wire 24, wire 24 will be heated by ohmic heating. When wire 24 is heated in this way, wire 24 will contract in directions 26. By forming wire 24 into appropriate shapes within fabric 18 or other structures in device 10, haptic feedback devices such as devices 16 may be formed. Wire 24 (and, if desired, other strands in fabric 18) may have a diameter of 20-40 microns, more than 5 microns, less than 100 microns, or other suitable diameter. These relatively small diameters allow wire 24 to be incorporated into fabric 18 even in configurations in which fabric 18 is soft and flexible. Wire 24 may also be incorporated into rigid fabric.

Wire 24 may be used to form haptic devices in which wire 24 is bent (e.g., in which wire 24 undulates back and forth), may be used to form haptic devices in which wire 24 is stressed in torsion (e.g., configurations in which wire 24 is coiled into the shape of a spring), and may be used to form haptic devices in which wire 24 is tensioned along its length. Configuration in which wire 24 is tensioned along its length may be used in applications in which it is desired to conserve power, because tensioned shape memory alloy wire configurations tend to be more efficient at creating haptic output than torsion and bending configurations. In general, however, any suitable arrangement may be used in forming haptic devices 16 (e.g., bending, torsion, or tension).

Figure 4:
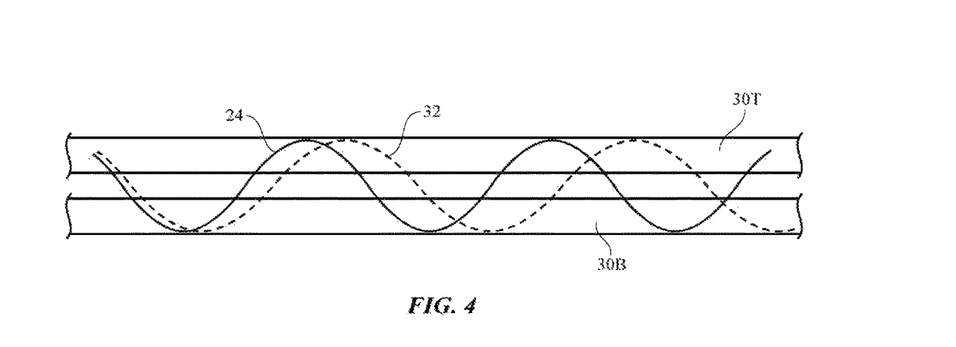
FIG. 4 is a cross-sectional side view of an illustrative spacer fabric with shape memory alloy wire in an unexpanded configuration in accordance with an embodiment.
Figure 5:
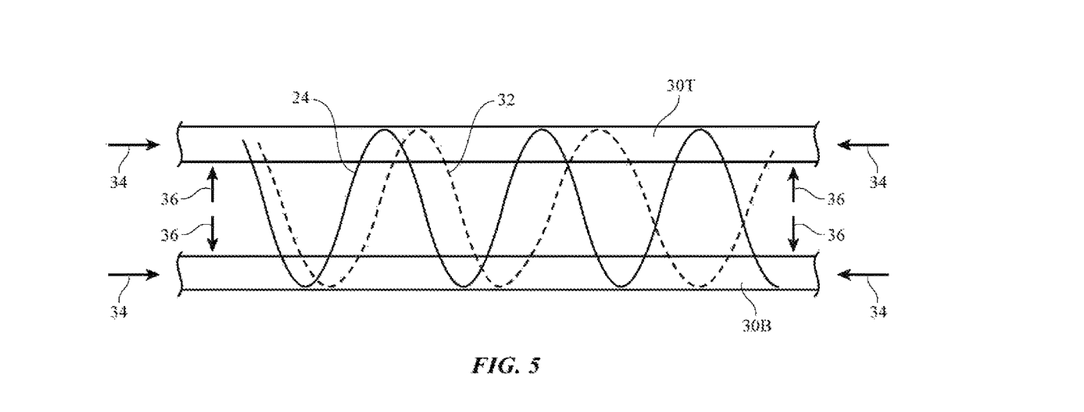
FIG. 5 is a cross-sectional side view of an illustrative spacer fabric with shape memory alloy wire in an expanded configuration in which the shape memory alloy wire is tensioned by an undulating spacer monofilament that runs between upper and lower fabric layers in accordance with an embodiment.

If desired, wire 24 for haptic device 16 may be incorporated into a three-dimensional fabric such as a spacer fabric. FIGS. 4 and 5 illustrate how wire 24 may be incorporated into spacer fabric and placed under tension. As shown in FIG. 4, spacer strands such as spacer strand 32 may run between two layers of fabric such as fabric layers 30T and 30B. Strand 32 may be, for example, a polymer monofilament. Wire 24 may also run between layers 30T and 30B. Fabric layers 30T and 30B may be woven fabric layers or other fabric and may be stretched laterally outwards while incorporating strands 32 and wires 24. Strand 32 may pass back and forth between layers 30T and 30B with a first undulation frequency. Wire 24 may pass back and forth between layers 30T and 30B with a second undulation frequency that is different than the first frequency (e.g., a second undulation frequency that is higher than the first frequency). When layers 30T and 30B are released (i.e., when layers 30T and 30B are no longer being stretched outwards), layers 30T and 30B will retract inwardly in directions 34, as shown in FIG. 5. This reduces the lateral spacing between the undulations in spacer strands 32. The lateral spacing reduction in the undulations of spacer strands 32 forces layers 30T and 30B apart in directions 36 and tensions wire 24. Wire 24 of FIG. 5 may be used to form one or more haptic output devices 16. When it is desired to provide haptic output, current may be applied to wire 24 to produce vibrations. Current may be supplied to wire 24 using conductive warp and weft fibers in fabric layers such as layers 30T and 30B (see, e.g., fabric 18 of FIG. 2) or other signal paths. The resistivity of the conductive warp and weft strands or other signal paths being used to supply current to wire 24 is preferably less than the resistivity of wire 24, so that ohmic heating is concentrated within wire 24 and not the signal lines feeding wire 24.

If desired, wire 24 may be tensioned using a rigid printed circuit board substrate or other rigid support structure. Wire 24 may, for example, be provided in segments that have opposing ends. Each end of each wire segment may be anchored to a portion of the rigid support structure. In general, the ends of wire 24 (or points midway along the length of wire 24) may be anchored to a printed circuit board using any suitable anchoring mechanisms (welds, crimps, anchoring holes, solder, adhesive, screws or other fasteners, brackets, etc.).

Figure 6:
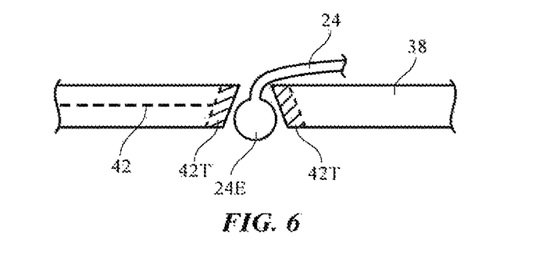
FIG. 6 is cross-sectional side view of an illustrative printed circuit board with a tapered opening that retains an enlarged end of a shape memory alloy wire in accordance with an embodiment.

With one illustrative arrangement, which is illustrated in the cross-sectional side view of FIG. 6, wire 24 may have enlarged ends such as end 24E. Enlarged end 24E may be formed by crimping, laser processing, wire bonding equipment, or other equipment for forming an enlarged end on wire 24. Printed circuit board 38 may have wire retention openings (e.g., a tapered opening of the type shown in FIG. 6) to receives enlarged ends such as enlarged end 24E. Wire 24 is placed under tension, so each enlarged end 24E is pulled up into a respective wire end retention opening in printed circuit board 38. Due to the relatively small size of the hole at the upper end of the tapered opening, enlarged end 24E is trapped in the tapered opening and presses against metal traces such as metal sidewall contacts 42T in the opening. Other metal traces (e.g., traces 42) in printed circuit 38 may be used to couple wire 24 to pads or other contacts on printed circuit 28 and/or other circuitry mounted on printed circuit 38. With this type of configuration, each end 24E of wire 24 may be secured in an opening in printed circuit 38. With the ends of wire 24 secured in this way, wire 24 may be maintained under tension, thereby allowing wire 24 to form an efficient haptic output device 16.

Figure 7:
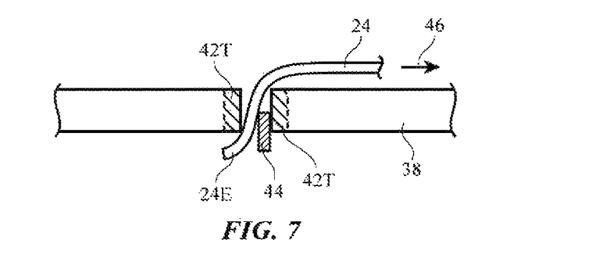
FIG. 7 is a cross-sectional side view of an illustrative printed circuit board with a wire retention structure such as wire peg that helps hold the end of a shape memory alloy wire within an opening in the printed circuit board in accordance with an embodiment.

FIG. 7 shows how a peg or other securing structure (see, e.g., metal wire retention peg 44) may be used in securing end 24E of wire 24 in a wire end retention opening in printed circuit 38 (e.g., so that wire end 24E electrically connects to metal traces such as traces 42). Wire 24 of FIG. 7 may be held in tension (e.g., by stretching wire 24 in direction 46 after end 24E has been secured to printed circuit board 38 using peg 44 or other suitable attachment structure).

Figure 8:
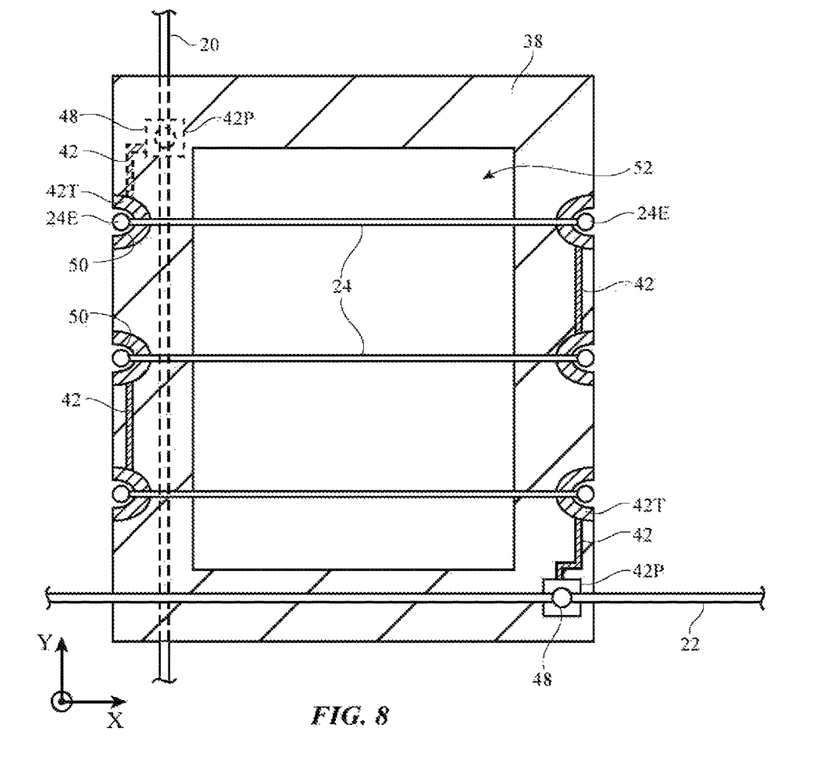
FIG. 8 is a top view of an illustrative printed circuit board with an opening spanned by tensioned shape memory alloy wires in accordance with an embodiment.

FIG. 8 is a top view of an illustrative haptic output device formed by stretching multiple lengths of wire 24 across an opening in a printed circuit board. As shown in FIG. 8, printed circuit board 38 may have an opening such as opening 52. Opening 52 may have a size and shape appropriate for forming a keyboard key (i.e., opening 52 may have the size of a user's fingertip). A fabric covering (e.g., fabric 18) or other flexible covering layer with an alphanumeric label (e.g., a key symbol) may overlap printed circuit 38 and opening 52. Printed circuit substrate 38 may have wire retention openings for securing the ends of wires 24. As an example, printed circuit substrate 38 may have recesses such as notches 50 along opposing edges of substrate 38 that receive wire 24. Ends 24E of wires 24 may be enlarged so that ends 24 catch in notches 50. This allows wires 24 to be stretched across opening 52 and held in tension.

Metal traces 42 (including contacts 42T for contacting ends 24E of wires 24) may be used to couple together multiple segments of wire 24 in series as shown in FIG. 8 or may be used to couple wire segments in parallel or other suitable configurations. Current may be supplied to shape memory alloy wire 24 of FIG. 8 using any suitable signal paths. In the example of FIG. 8, metal traces in printed circuit 38 such contact pads 42P formed respectively on the lower and upper surfaces of printed circuit 38 may be coupled to conductive warp strand 20 and conductive weft strand 22, respectively using conductive material 48. Conductive material 48 may be solder, metal deposited using a laser, melted metal created during laser welding, or other suitable conductive material. An array of printed circuit haptic devices such as the device of FIG. 8 may be used to form a keyboard or other input device or a larger printed circuit may be provided with an array of openings 52 each of which is spanned by wire 24.

When it is desired to activate the haptic device formed from the structures of FIG. 8, control circuitry 12 may supply current to wire 24 through strands 20 and 22. Wire 24 may be tensioned by stretching wire 24 across opening 52 and, if desired, may be further tensioned when a user presses downwardly on strands 52 (i.e., in direction—Z of FIG. 8) as part of a key press operation. Wire 24 may form part of an input device for device 10 (e.g., a capacitive touch sensor, force sensor, switch, etc.) or wire 24 and opening 52 may be mounted in alignment with a separate input device (e.g., a light-based proximity sensor, a switch, a capacitive touch sensor, etc.).

Figure 9:
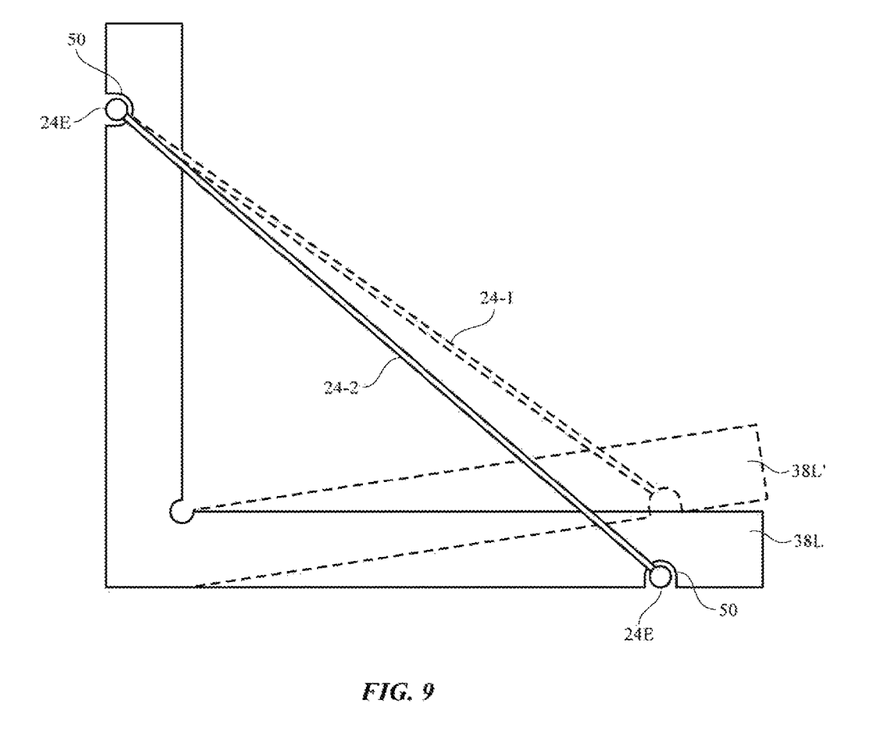
FIG. 9 is a portion of a printed circuit board with an illustrative arrangement that allows the printed circuit board to be compressed during attachment of a shape memory alloy wire to the printed circuit board so that the printed circuit board tensions the shape memory alloy wire when returned to its uncompressed state in accordance with an embodiment.

FIG. 9 shows how a printed circuit substrate or other substrate may be compressed during attachment of wire 24. When compressed, the illustrative L-shaped printed circuit substrate of FIG. 9 may assume compressed shape 38L'. While the substrate is in this configuration, the ends of a length of shape memory alloy wire 24 may be attached to notches 50 (see, e.g., wire segment 24-1). The substrate can then be released. Due to the elastic nature of the substrate, the substrate will spring back to uncompressed shape 38L. This tensions the shape memory alloy wire (see, e.g., tensioned wire segment 24-2). If desired, rectangular printed circuit board substrates of the type shown in FIG. 8 (e.g., rectangular ring-shaped substrates) may likewise be compressed while segments of wire 24 are being attached to notches 50. The L-shaped substrate of FIG. 9 is shown as an example.

Figure 10:
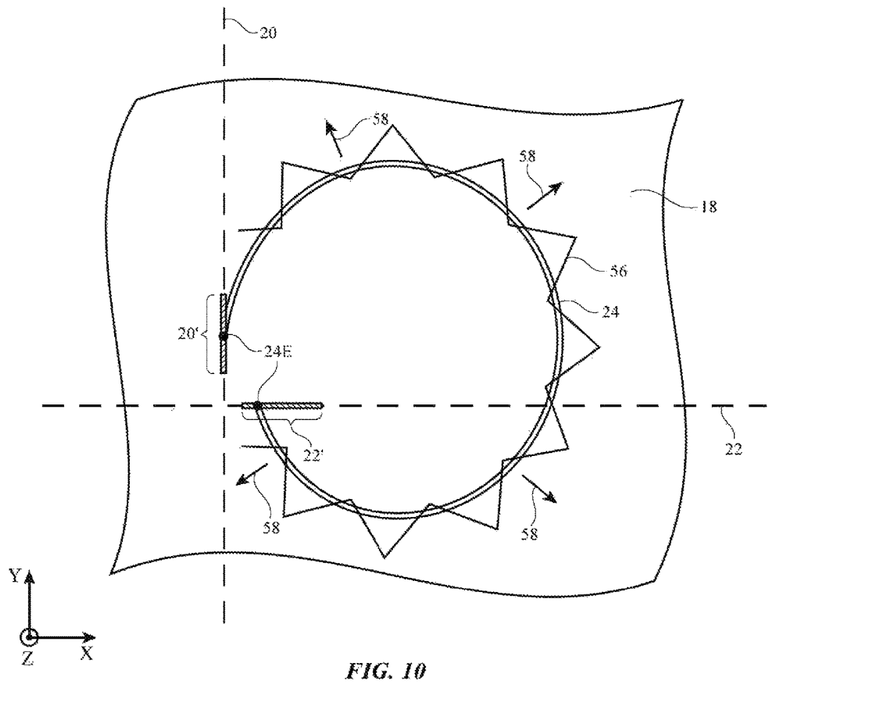
FIG. 10 is a top view of an illustrative loop of shape memory alloy wire that has been pulled outwardly by tensioning threads sewn into a fabric in accordance with an embodiment.

In the illustrative arrangement of FIG. 10, shape memory alloy wire 24 has been mounted on fabric 18. Sewn (embroidered) yarn such as strands 56 may have a zigzag pattern or other pattern with segments that pull wire 24 outwardly in directions 58, thereby tensioning wire 24. The ends of wire 24 may be coupled to exposed portions of warp strand 20 (see, e.g., exposed warp strand segment 20') and weft strand 22 (see, e.g., exposed weft strand segment 22') or the ends of the loop of wire 24 of FIG. 10 may otherwise be coupled to signal lines that can route control signals to wire 24 from control circuitry 12. When current is applied to wire 24, wire 24 will contract and cause a portion of fabric 18 such as the portion of fabric 18 within the wire loop of FIG. 10 to protrude (e.g., upward in direction Z in FIG. 10) to serve as haptic output for a user's finger that is in contact with that portion of fabric 18.

Conductive connections between the ends of wire 24 and conductive warp and weft strands in fabric 18 may be formed using any suitable technique. The conductive connections may, for example, be formed by laser welding or other welding techniques, by soldering, by crimping, using clips or other fasteners, or using other suitable techniques. With one illustrative arrangement, sometimes referred to as a laser induced forward transfer technique, a metal donor layer is formed on the underside of a transparent substrate such as a glass substrate. Pulses of laser light are applied to the metal donor layer through the transparent substrate. The laser light pulses cause molten droplets of the metal of the donor layer to be deposited onto a desired target. This technique may be used to form a conductive connection between wire 24 and conductive warp or weft strands in fabric 18 (i.e., a metal joint may be laser deposited over the ends of wire 24 at exposed warp strand portion 20' and exposed weft strand portion 22'). Other techniques may be used in forming conductive connections between wire 24 and conductive strands such as strands 20 and 22 that supply signals to wire 24, if desired. These techniques may also be used in forming connections with pads 42P or other printed circuit board traces in printed circuit boards such as printed circuit board 38 of FIG. 8. The resistivity of the conductive warp and weft strands or other signal paths being used to supply current to wire 24 is preferably less than the resistivity of wire 24, so that ohmic heating is concentrated within wire 24 and not the signal lines feeding wire 24.

Figure 11:
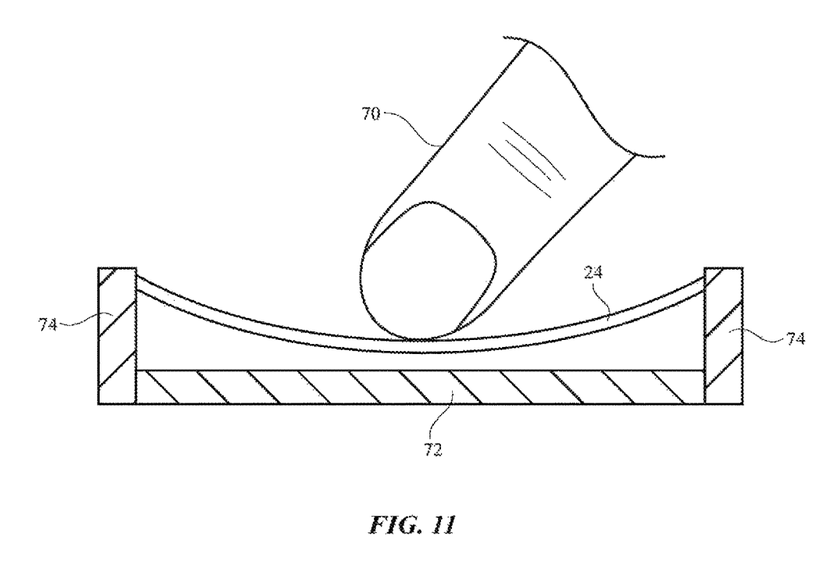
FIG. 11 is a cross-sectional side view of an illustrative shape memory alloy haptic device that is being used to gather user input in accordance with an embodiment.

If desired, wire 24 and other conductive strands of material (in fabric 18, coupled to printed circuit 38, etc.) may be used in forming sensors. Consider, as an example, the haptic feedback arrangement of FIG. 11. In the example of FIG. 11, support structure 74 (e.g., a printed circuit such as printed circuit 38 of FIG. 8, fabric such as fabric 18, or other structure) has been provided with a signal path such as path 72. Path 72 may be formed from a conductive warp or weft strand in a fabric layer, may be formed from a metal trace on a printed circuit, may be formed from shape memory alloy wire, or may be formed from other conductive structure. Shape memory alloy wire 24 may overlap at least part of path 72. When a user's finger such as finger 70 rests against wire 24, control circuitry 12 may supply current to wire 24 to heat and thereby contract wire 24. In this way, wire 24 may be used as a haptic output device. At the same time, control circuitry 12 may monitor the structures of FIG. 11 for input (i.e., the structures of FIG. 11 may serve both as a haptic output device and as an input device).

Downward pressure from finger 70 may cause wire 24 to move towards path 72. Control circuitry 12 may monitor the conductive paths in FIG. 11 for input using any suitable monitoring technique.

With one illustrative arrangement, control circuitry 12 monitors the resistance between wire 24 and path 72. In this type of arrangement, wire 24 and path 72 serve as switch terminals and control circuitry 12 determines whether wire 24 and path 72 are contacting each other and forming a short circuit (forming a closed switch state) or are separated from each other and are forming an open circuit (forming an open switch state).

With another illustrative arrangement, control circuitry 12 measures the capacitance between wire 24 and path 72. In this configuration, wire 24 and path 72 serve as capacitor electrodes in a capacitive sensor. The amount that wire 24 is pressed downwards by finger 70 affects the separation between wire 24 and path 74 and therefore gives rise to an associated capacitance value between wire 24 and path 74. Control circuitry 12 may convert capacitance measurements into force values (i.e., the structures of FIG. 11 may be operated as a capacitive force sensor) or may convert capacitance measurements into binary output (i.e., the structures of FIG. 11 may be used as a capacitive touch sensor switch in which the presence of a finger is detected or not detected by comparing capacitance measurements to a predetermined threshold).

Other types of capacitance measurements, resistive measurements, and/or other signal measurements may be made on conductive structures formed from shape memory alloy wire 24 and/or other metal structures such as wires 20 and/or 22, etc., if desired. For example, a grid of overlapping conductive warp and weft strands may be used in forming a capacitive touch sensor and an array of haptic devices formed from memory alloy wire 24 may overlap this grid. The capacitive touch sensor grid may be used to gather touch input from a user's finger (e.g., the capacitive touch sensor grid may operate as a track pad and/or keyboard) and the haptic devices formed from memory alloy wire 24 may provide haptic feedback as the user is providing input (i.e., there may be a haptic feedback device formed from shape memory alloy wire 24 for each key in the keyboard, etc.).

Figure 12:
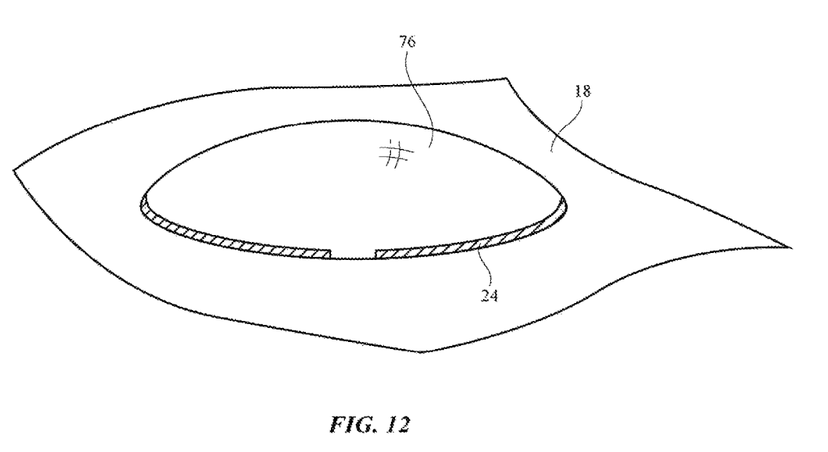
FIG. 12 is a perspective view of an illustrative dome shaped structure that has been surrounded by loop of shape memory alloy wire to form a haptic output device in accordance with an embodiment.

If desired, shape memory alloy wire 24 may be looped around a dome structure such as illustrative dome 76 of FIG. 12. Dome 76 may be formed from a flexible material such as silicone or other elastomeric polymer, may be formed from a flexible material such as fabric, or may be formed from other suitable structures. Dome 76 may be mounted to a printed circuit substrate, to a fabric substrate such as fabric 18 of FIG. 12, or other suitable support structure. If desired, dome 76 may be a fabric dome that is formed as an integral portion of a fabric layer such as fabric layer 18 of FIG. 12. Shape memory alloy wire 24 may have a loop shape that runs along the circular periphery of dome 76. When current is applied to wire 24, wire 24 will contract and thereby cause dome 76 to protrude upward. If a user's finger is in contact with dome 76 (directly or through a layer of fabric or other material overlapping dome 76), the user will be provided with haptic output as a result of the upward movement of dome 76. If desired, an input device may be incorporated into a dome-based haptic device (e.g., dome 76 may be a dome switch for detecting finger presses, etc.).

Figure 13:
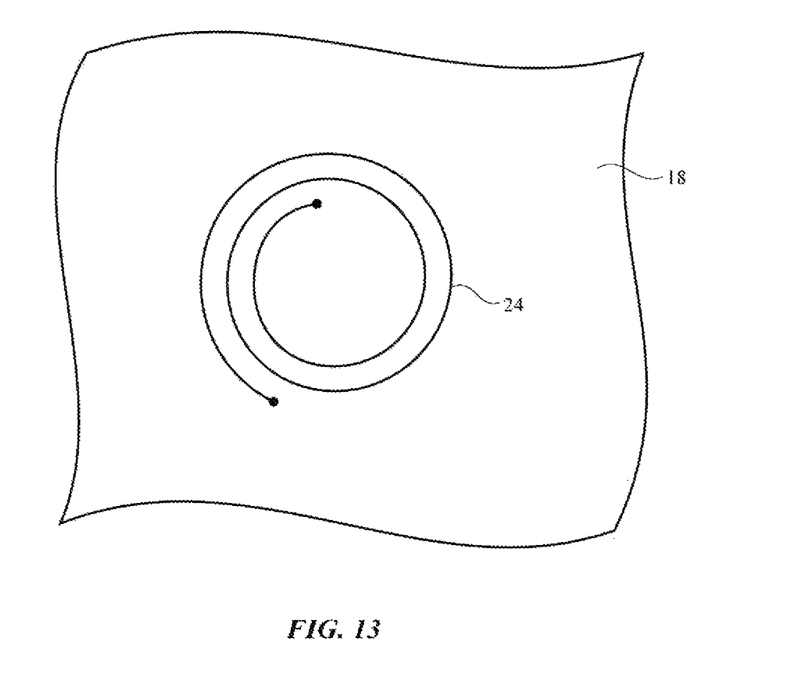
FIG. 13 is a top view of an illustrative spiral shape memory alloy wire segment for a haptic device in accordance with an embodiment.

FIG. 13 is a top view of an illustrative spiral segment of shape memory alloy wire 24 that has been used to form a haptic output device on fabric 18. Wire 24 may be held in place using embroidery (e.g., yarn or other strands of material that are sewn into fabric 18) or may be secured using adhesive, welds, solder, fasteners, etc. There are more loops of wire 24 in a spiral shaped haptic device than in a haptic device based on a single loop of wire 24, which may help increase the amount of haptic output that is produced. If desired, loops of wire 24 may have non-spiral circular shapes with multiple loops (i.e., each of the turns of a multi-turn loop may have substantially the same diameter).

Configurations in which wire 24 has both multiple concentric circular turns and an inner spiral portion may also be used in forming haptic devices 16. The spiral shape of wire 24 in FIG. 13 is merely illustrative.

Haptic devices 16 may be aligned with input devices such as switches (e.g., dome switches), capacitive touch sensors, capacitive force sensors, optical sensors (e.g., light-based proximity sensors each having a light emitter and a light detector for measuring scattered light that has been emitted by the light emitter), force or touch sensors based on changes in resistance of fabric, foam, or other materials, piezoelectric sensors, or other input devices. Haptic devices may be used to supply vibrating output to alert a user to the occurrence of particular events and/or may supply vibrating output in response to detection of a user input event (e.g., a key press, button press, or other input in which the user touches and/or applies force to an input device). Haptic devices and associated input devices such as keys (buttons) may, for example, be provided in a keyboard array to form a keyboard, may be arranged in a row or other pattern on a fabric watch band, may be formed in an array or other pattern on the sleeve or pocket of an item of clothing, etc. If desired, shape memory alloy wire 24 may be used to apply force to a user's finger, arm, or other body part (e.g., to serve as a blood pressure measurement arm cuff, to provide haptic feedback to a finger in a glove, etc.). In configurations such as these, loops of shape memory wire 24 may be incorporated into fabric or other material and may surround a user's arm, finger, etc. For example, loops of wire 24 may be used to surround fingers in a fabric glove to provide a user's fingers with haptic feedback when the user is wearing the glove.

The foregoing is merely illustrative and various modifications can be made to the described embodiments. The foregoing embodiments may be implemented individually or in any combination.

What is claimed is:

1. An electronic device, comprising:
    a printed circuit board having at least one opening;
    shape memory alloy wire that spans the opening and that has ends that are secured to the printed circuit board;
    control circuitry that is configured to supply haptic output with the shape memory alloy wire by applying current to the shape memory alloy wire; and
    fabric having conductive strands configured to carry the current to the shape memory alloy wire.

2. The electronic device defined in claim 1 wherein the printed circuit has metal traces that are coupled to the shape memory alloy wire.

3. The electronic device defined in claim 2 wherein the conductive strands are coupled to the metal traces.

4. The electronic device defined in claim 3 wherein the conductive strands include a conductive warp strand and a conductive weft strand, wherein the printed circuit board has opposing first and second surfaces, wherein the conductive warp strand is coupled to a first portion of the metal traces on the first surface, and wherein the conductive weft strand is coupled to a second portion of the metal traces on the second surface.

5. The electronic device defined in claim 4 wherein the shape memory alloy wire comprises a plurality of segments each of which spans the opening.

6. The electronic device defined in claim 5 wherein the metal traces are configured to supply the current in series to the segments that span the opening.

7. The electronic device defined in claim 1 wherein the shape memory alloy wire includes enlarged ends and wherein the printed circuit board has wire retention openings that receive the enlarged ends and that tension the shape memory alloy wire across the opening.

8. The electronic device defined in claim 7 wherein the wire retention openings comprise notches in edges of the printed circuit board and wherein the printed circuit board comprises metal traces in the notches.

9. The electronic device defined in claim 1 wherein the control circuitry is configured to gather signals from the shape memory alloy wire.

10. The electronic device defined in claim 1 where the shape memory alloy wire has ends and wherein the printed circuit board has edges with recesses that receive the ends so that the shape memory alloy wire is tensioned across the opening.

11. The electronic device defined in claim 10 further comprising metal retention pegs that secure the ends in the recesses.

12. A haptic output device that is controlled by current supplied by control circuitry, comprising:
    a layer of fabric having conductive strands;
    a loop of shape memory alloy wire that receives the current, wherein the conductive strands are configured to carry the current to the loop of shape memory alloy wire; and
    strands of material that are sewn into the layer of fabric and that tension the loop of shape memory alloy wire.

13. The haptic output device defined in claim 12 wherein the loop of shape memory alloy has ends and wherein the ends are coupled to the conductive strands of material using laser-deposited molten metal droplets.

14. The haptic output device defined in claim 12 wherein the conductive strands of material comprise conductive warp strands and conductive weft strands, wherein the loop of shape memory alloy has first and second ends, wherein one of the conductive warp strands is coupled to the first end, and wherein one of the conductive weft strands is coupled to the second end.

15. Apparatus, comprising:
    a first fabric layer;
    a second fabric layer, wherein at least one of the first and second fabric layers comprises conductive strands;
    undulating strands of material that pass between the first and second fabric layers and space the first and second fabric layers apart from each other;
    an undulating shape memory alloy wire that passes between the first and second fabric layers and that is tensioned by the undulating strands of material; and
    control circuitry configured to supply current to the undulating shape memory alloy wire to provide haptic output through the conductive strands.

16. The apparatus defined in claim 15 wherein the first and second fabric layers comprise woven fabric layers.

17. The apparatus defined in claim 16 wherein the undulating strands of material comprise polymer monofilaments.

* * * * *